(12) United States Patent
Daniel (10) Patent No.: US 9,721,077 B1
(45) Date of Patent: Aug. 1, 2017

(54) SECURE ELECTRONIC CHARGER CASE FOR MOBILE COMMUNICATION DEVICES

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 109 days.

(21) Appl. No.: 14/875,550

(22) Filed: Oct. 5, 2015

Related U.S. Application Data (60) Provisional application No. 62/059,550, filed on Oct. 3, 2014.

(51) Int. Cl.
| | |
|---|---|
| G06F 21/00 | (2013.01) |
| G06F 21/31 | (2013.01) |
| H02J 7/00 | (2006.01) |
| H04B 1/3883 | (2015.01) |
| H04B 1/3888 | (2015.01) |
| H04W 88/02 | (2009.01) |
| G06F 21/86 | (2013.01) |
| G06F 21/60 | (2013.01) |

(52) U.S. Cl.
CPC ............ *G06F 21/31* (2013.01); *G06F 21/604* (2013.01); *G06F 21/86* (2013.01); *H02J 7/0045* (2013.01); *H04B 1/3883* (2013.01); *H04B 1/3888* (2013.01); *H04W 88/02* (2013.01); *H02J 2007/0096* (2013.01)

(58) Field of Classification Search
CPC .................................. G06F 21/31; G06F 21/86
See application file for complete search history.

(56) References Cited

U.S. PATENT DOCUMENTS

| | | | | |
|---|---|---|---|---|
| 8,855,310 B2* | 10/2014 | Kirkup | ................... | H04W 12/04 380/270 |
| 8,935,793 B2* | 1/2015 | Weinstein | ............. | G06F 21/577 726/25 |
| 8,996,876 B2* | 3/2015 | Outwater | ............... | G06Q 30/06 713/176 |
| 9,088,029 B2 | 7/2015 | Huang et al. | | |
| 9,495,375 B2* | 11/2016 | Huang | ............. | H04W 52/0225 |
| 2007/0279002 A1* | 12/2007 | Partovi | ................. | H02J 7/0027 320/115 |
| 2008/0319912 A1* | 12/2008 | Faith | .................... | G06Q 20/341 705/65 |
| 2009/0102420 A1* | 4/2009 | Uehlein-Proctor | ... | H02J 7/0045 320/114 |
| 2009/0132813 A1* | 5/2009 | Schibuk | ............... | G06Q 20/223 713/158 |
| 2011/0060669 A1* | 3/2011 | Laves | .................... | G06Q 30/04 705/34 |

(Continued)

*Primary Examiner* — Ali Shayanfar
(74) *Attorney, Agent, or Firm* — Alberto Interian, III, Esq.

(57) ABSTRACT

The present invention is directed to an apparatus, a secure electronic charger case for mobile communication devices (e.g. mobile communication devices, iPads, Phablets and the like), providing additional battery life in a rigid and sturdy, yet light-weight case, as well as providing a secured apparatus, system and method of extracting electronic data from a network enabled device, converting the electronic data into encrypted, concealed data that is stored in a secured, encrypted format on removable memory modules on the electronic charger case, and for which access is limited to user authentication via an authentication module. Upon user authentication, the concealed data may be accessed using an application software program, retrieved and converted into decrypted, viewable electronic data.

19 Claims, 7 Drawing Sheets

(56) References Cited

U.S. PATENT DOCUMENTS

| | | | | |
|---|---|---|---|---|
| 2013/0227694 A1* | 8/2013 | Weinstein | ............ | G06F 21/577 726/25 |
| 2014/0009111 A1* | 1/2014 | Nagasaki | .......... | H01M 8/04089 320/108 |
| 2014/0365773 A1* | 12/2014 | Gerhardt | ............ | G07C 9/00309 713/168 |
| 2016/0109242 A1* | 4/2016 | Applegate | ............ | G01C 21/206 701/431 |

* cited by examiner

SECURE ELECTRONIC CHARGER CASE FOR MOBILE COMMUNICATION DEVICES

PRIORITY CLAIM

This patent application is a non-provisional patent application and claims priority under 35 U.S.C. §119(e) to U.S. Provisional Patent Application Ser. No. 62/059,550, titled "Secure Electronic Charger Case for Mobile Communication Devices" filed Oct. 3, 2014. The entire disclosure of the afore-mentioned patent application is incorporated by reference as if fully stated herein.

FIELD OF THE INVENTION

The present invention is directed to an apparatus, a secure electronic charger case for mobile communication devices (e.g. mobile communication devices, iPads, Phablets and the like), providing additional battery life in a rigid and sturdy, yet light-weight case, as well as providing a secured apparatus, system and method of extracting electronic data from a network enabled device, converting the electronic data into encrypted, concealed data that is stored in a secured, encrypted format on removable memory modules on the electronic charger case, and for which access is limited to user authentication via an authentication module. Upon user authentication, the concealed data may be accessed using an application software program, retrieved and converted into decrypted, viewable electronic data.

BACKGROUND OF THE INVENTION

As mobile markets continue to expand, more and more proprietary and valuable information is being accessed and/or stored on an individual's personal mobile communication devices, e.g. contact information, photographs, text messages, further providing access to emails, social networks, navigation instructions, and the like. However, instead of the proprietary information (e.g. documents, photographs, and other proprietary content) stored thereon remaining personal and confidential to the user as originally intended, theft and hacking have compromised the security of the proprietary information as there are now more avenues for unauthorized information access. Thus, there is a need for a secure apparatus, system and method for storing electronic personal information in a secure, encrypted format, readily retrievable in a reasonable easy and efficient manner with proper authentication.

Further, the use of mobile phones is often the only option for connectivity to work and home environment in certain remote areas. Therefore, it can be really difficult when the battery fails to last beyond an expected duration. Several portable external battery chargers currently exist for cordless charging, but invariably these external battery chargers are heavy and are an additional item for users to lug around. Accordingly, the various embodiments and disclosures described herein satisfies these long felt needs and solves the limitations of the prior art in a new and novel manner.

The following discussion describes in detail, varied embodiments of the apparatus, system and methods disclosed herein. However, this discussion should not be construed, as limiting the invention to those particular embodiments, as practitioners skilled in the art will appreciate that the apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

SUMMARY OF THE INVENTION

The apparatus, system and method described herein comprises of an electronic charger case comprising of: a housing shaped to substantially enclose a rear of a mobile device within its primary aperture, i.e. a cradle, being adapted to be releasably locked together with the mobile device in a connected position forming a unitary device with the mobile device such that the mobile device would not otherwise require the traditional rear panel cover for the mobile device's internal battery, electronic circuitry and the like; at least one or more means, e.g. SD Card Slot, for accepting at least one removable secure memory module that is disposed in communication with at least one processor, enabled for controlling the various functionalities for the secure electronic charger case; an authentication module, disposed in communication with the at least one processor, enabled for receiving user authentication information and authenticating the user using password verification, biometric identifiers and/or a combination of both; battery and battery charging circuit positioned within the electronic charger case's housing, enabled for supplying backup power to the mobile device, when the mobile device is resting in the charger case's cradle; a plurality of secondary apertures adapted to enable access to the mobile device's periphery devices and/or a display of the mobile device's source identifying logo; an activation switch enabled for powering the charger case on and off by activating charging of the mobile device and/or electronic charger case when connected to an external power source via a charger port; and a connection interface (USB) enabled for electronically connecting the electronic charge case with the mobile device.

The electronic charger case comprises of a serialized authentication chip for managing and allowing access through the mobile device in order to only allow authorized connectors to connect to the mobile devices; a USB cable to provide electronic communication between the mobile device and the electronic charger case; and a USB port enabled for charging the cradle's battery with an external power source. The battery's charging circuit comprises of a circuit board, formed from a polyimide film which is flexible yet can remain stable in a wide range of extreme temperatures, e.g. Kapton®. The circuit board may be formed from silicon, fiberglass, Mylar, or other suitable materials that are well known and used in the art. Electrical wiring connects the circuit board with the activation (ON/OFF) switch and/or the LED indicator (i.e. a light emitting diode ("LED") display, e.g. lights) such that once the activation switch is switched to the "ON" position, LED indicator serves as a visual indicator as to whether the cradle is on/off and/or whether the mobile device is charging while in the cradle.

The system and method employing the secure electronic charger case allows a user to selectively extract electronic data (text, images, contact lists and the like) from a mobile communication device and relocate the extracted data to the portable secure electronic charger case when both are electronically connected, where it is stored in an encrypted format. In some embodiments of the invention, the information stored on the electronic charger case is not viewable on the mobile device, since the electronic data is hidden on the electronic charger case, such that other like information and/or folders when displayed on the mobile device's displaying means will not include the hidden electronic data being stored on the electronic charger case. The electronic data is not accessible, unless the user attempting to access the information is properly authenticated.

Additionally, the electronic charger case uses a graphical user interface (software application) accessible from the mobile communication device's displaying means, from which the user may selectively extract desired proprietary information to be securely stored on the electronic charger case as encrypted data. The encrypted data is stored within one or more removable secure memory module (e.g. a Secure Digital ("SD") card) that resides on the charger case. In some embodiments, biometric fingerprint authentication on the mobile communication device and/or the charger case is utilized to provide an additional layer of security.

The software application program provides the following functionality: user interface that allows the user selection of electronic data being moved to the charger case; encryption of the electronic data being stored on the electronic charger case; moves the electronic data from the mobile device to the charger case; removes the electronic data from the mobile communication device or the charger case; and/or retrieves the electronic data from the charger case to the mobile communication device.

BRIEF DESCRIPTION OF THE DRAWING

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

Apparatus

FIGS. 1A-1D show an exemplary secure electronic charger case 100 used in the system and method of the invention. As previously discussed, the electronic charger case 100 comprises of: a housing 102 shaped to substantially enclose a rear of a mobile device 104 within its primary aperture 106, i.e. a cradle 106, with the housing 102 being adapted to be releasably locked together with the mobile device 104 in a connected position forming a unitary device, i.e. replacing the traditional rear non-electronic panel cover protecting the mobile device's internal electronic circuitry, battery and other like system components; at least one or more means 108, 108' for accepting at least one or more memory modules 110, 110' disposed in communication with at least one processor 112; an authentication module 114, disposed in communication with the at least one processor 112 and enabled for receiving user authentication information and authenticating the user's authorization to access concealed data stored and hidden on the electronic charger case 100 using the received user authentication information; an integrated rechargeable battery 116 cell with charger circuitry housed within the housing 102; a plurality of secondary apertures 118, 118' adapted to enable access to the mobile device's periphery devices and/or a display of the mobile device's logo; an activation switch 120 enabled for activating charging of the mobile device's battery when it is in the connected position within the electronic charger case's housing 102, and/or the charger case 100 when it is connected to an external power source via a charger port 122 as are well known and used in the arts; and a connection interface (USB) 124 for electronically connecting the electronic charger case 100 with the mobile device 104 to lock the electronic charger case 100 in the connected position by preventing relative movement between the housing 102 and the mobile phone 104 by maintaining the engagement until the housing 102 or the mobile phone 104 is released.

The electronic charger case 100 is configured to be used as a rear panel of a mobile device 104 when releasably connected to the electronic charger case 100 forming a unitary device for the mobile device's internal battery, electronic circuitry and the like, effectively making redundant/replacing a mobile device's traditional non-electronic rear panel cover. Charger case 100 may supply primary and/or auxiliary power to the mobile device 106 via the charger case's battery 116 that includes a rechargeable power cell in communication with a battery charging circuit, configured for providing power to the charger case and/or the mobile device 104 such that the mobile device 104 may function as designed. The electronic charger case 100 is releasably attached to the mobile device 104 enabling access to the mobile device's internal electronic circuitry, battery and other system components. Charger case's 100 exterior housing may be constructed from premium "rugged" material, e.g. hard plastic or metal capable of surviving forceful impact due to the majority of life's mishaps including splashes and spills, dirt, dust, and grime.

Charger case's housing 102 is adapted (i.e. shaped) to substantially enclose a rear of a mobile device 104 within a primary aperture 106, i.e. a cradle 106, with the housing 102 being adapted to be releasably locked together with the mobile device 104 in a connected position, wherein the connection is accomplished with a connection interface 124 that electronically connects the electronic charger case 100 with the mobile device 104 such that electronic communication between the two can be established and controlled with access to the electronic data that was converted to encrypted concealed data stored on the charger case 100 being made available upon user authentication and/or input using the mobile device's input means, e.g. a pointing device, roller ball, arrow keys, or any other input device and/or other controller. The exterior perimeter of the charger case's housing 102 at least partially encases the outer walls of a rear of the mobile device, such that it may be releasably engaged for locking with the mobile device 102.

The housing 102 includes a top, bottom and two (2) side walls in mating engagement, with a lip extending from each of the four walls along the housing's perimeter, wherein the lip is configured for securely and releasably fastening and attaching to the rear of the mobile device 104 such that the housing can be releasably locked with the mobile device until either the housing 102 or the mobile device 104 is disengaged and released. The housing 102 also includes an inner rear wall for mating engagement with the mobile device's rear, with a battery positioned between the inner rear wall and the exterior wall of the housing. The top, bottom, 2 side walls and the inner rear wall are configured for forming a substantially concave aperture, i.e. a cradle, for receiving the mobile device's rear providing protection for the inner electronic circuitry of the mobile device, wherein the side walls of the housing protrude upward and outward defining the lip contacting area causing a seal to be formed when the lip contacting area is engaged by the mobile device's rear.

The housing also includes secondary apertures 118, 118', 118" enabling access to e.g. the mobile device's power button, camera lens, source identifying logo, audio port, speaker and the like.

The term "module," as used throughout this disclosure, may refer to a unit of distinct functionality that may be presented in software, hardware, and/or combinations thereof. When the functionality of a module is performed in any part through software, the module includes a machine readable medium. These computer modules as described herein may be self-contained computer hardware resident on the processor 112 and may be computer hardware on a designated computer chip or separate computer chips. In yet another embodiment of the invention, the processor 112 may include computer processing module 126, and an instruction module 128, wherein the processing module 126 may be configured to perform others tasks not undertaken by the other modules. In a further embodiment of the invention, the various computer modules may be hardware resident on one chip, component, separate components or any combination thereof. In yet another embodiment of the invention, processing module 126, authentication module 114, memory module 110, instruction module 128, and/or the various modules disclosed herein may all be in electronic communication with computer processing module 126.

Mobile device 104 as used herein includes but is not limited to, cellular phones (e.g., an iPhone, Android, Palm, Blackberry, or any "smart phone" as are generally known and used in the arts), and/or other mobile communication devices that are currently known and are invented in the future.

Charger case 100 includes at least one or more means 108, 108' for accepting at least one or a plurality of removable, secure memory modules 110, 110' that are disposed in communication with at least one processor 112 and processing module 126, wherein the secure memory modules 110, 110' comprise of removable Secure Digital (SD) Memory cards such that the charger case's memory can be easily and efficiently upgraded at will by simply replacing/upgrading the removable secure memory modules 110, 110' as needed. The means for 108, 108' accepting at least one or a plurality of removable secure memory modules 110, 110' may comprise a traditional SD Memory card tray or slot, or multiple SD memory card trays, e.g. a dual-SD card tray, or any other type of tray or slot used to host removable digital memory as known in the arts or to be invented.

Electronic charger case's computer central processor 112 may comprise of any type of processor, such as, but not limited to, a computer processor, a server processor, a central processing unit (CPU), a microprocessor, a video processor, a front end processor, a coprocessor, a single-core central processor, a multi-core processor, and the like. Processor 112 may also be programmed to receive or prompt the user with instructions, which may be displayed on the mobile device's displaying means. Processor 112 may be operative to communicate electronically with the various modules disclosed herein and throughout the present disclosure and the like, and to control the various functionalities for the secure electronic charger case 100. Said electronic communication may comprise any type of electronic communication, such as a network communication, a direct communication, an indirect communication, a wired communication, a wireless communication, and the like.

Processor 112 includes a processing module 126 that may comprise of a hardware aspect such as a computer processor 112, including, but not limited to, any of those previously described herein and throughout the present disclosure and may be controlled by the instruction module 128 stored on one or more memory modules 110, 110', wherein the instruction module 128 also comprises computer executable instruction code. In some embodiments, processing module 126 may comprise of a software aspect, such as, but not limited to, a computer program, using computer executable instruction code, and the like. In yet another embodiment, processing module 126 may comprise both hardware and software aspects, such as those described directly above and elsewhere throughout the present disclosure. In some embodiments, processing module 126, may include software, e.g. computer software program, and hardware components to, for example, activating the detection module 130 for determining whether the electronic charger case 100 is in the connected position with the mobile device 100; determining whether the activation switch 120 has been activated for charging the mobile device 104 and/or the charger case 100; enabling charging of the mobile device 104 and/or the charger case 100. Processing module 126 may also be configured for activating the authentication module 114 for receiving password verification information (login id and password) and/or biometric data input of at least one user, validating the biometric data input of the at least one user with a stored password and/or biometric identifier; granting access to the concealed data stored and hidden on the charger case 100 if the user is authenticated, and preventing access to the concealed data if the user is not authenticated. Concealed data stored on the at least one memory module 110 includes but is not limited to: folders, documents, videos, pictures, SMS texts, contact listings, music downloads, third party applications, games, emails, calendars, notes, hyperlinks, downloaded data or call logs, and the like. Concealed data may be retrieved from the memory module 110 using the processor 112, processing module 126 and/or the instruction module 128.

Detection module 130 comprises a processor (which may be the same as, or different from the charger case's processor 112) in electronic communication with a sensor on/or proximally located near the at least one or more means 108, 108' for accepting at least one or more memory modules 110, 110'. Detection module 130 also comprises computer executable instructions that may be stored in the charger case's memory module 110 or in the instruction module 128, which when executed causes the processor to enable the sensor to detect the presence of one or more memory modules 110, 110' within the at least one means 108 for accepting at least one or a plurality of secure memory modules 110, 110', wherein at least one memory module 110 is enabled for receiving electronic data for storage from the mobile device 104, that is converted to encrypted concealed data and storing the concealed data thereon.

In some embodiments, authentication module 114 may comprise of software components such as computer executable instruction code for validating the identity of user using password verification software program(s). In some embodiments, authentication module 114 may comprise of software combined with hardware components for reading biometric data input, e.g. facial recognition software in combination with a facial scanner. Exemplary hardware components of the authentication module 114 comprise a computer processor (which may be the same as, or different from the charger case's processor 112) in electronic communication with a biometric scanner, e.g. a fingerprint scanner, hand geometry scanner, a palm geometry scanner, iris scanner, retina scanner, or a user interface, which includes an audio receiving circuit capable of receiving audio signals at predetermined frequencies and/or with additional hardware complete with electronic circuitry and such other biometric verification means that are known and used in the arts. Processor controls the functionality of the biometric scanner, generating the varied algorithms for storage of the initial valid biometric samples stored thereon as biometric identifiers and validates images of subsequent biometric samples received from the biometric scanner with the one or more biometric identifiers stored thereon. Components of the authentication module 114, e.g. a fingerprint scanner, may be located on the front, rear, top, bottom, side or any other location on the charger case 100 from which a valid biometric data input can be received.

In some embodiments, authentication module 114 includes a serialized authentication chip for managing and allowing access through the mobile device 104 in order to only allow authorized connectors to connect to the mobile device 104.

Charger case 100 is constructed from a durable and sturdy material providing protection to the mobile device 104 that is housed within, and includes a lightening male connection interface 124 for connecting to the mobile communication device creating an electronic connection providing for the mobile communication device to be charged when stored within the charger case 100 and use of the mobile devices periphery devices (camera, displaying means, input means and the like) for controlling and/or accessing the information stored on the charger case 100. When the charger case 100 and the mobile device 104 are in electronic communication a user may activate the application program 202 (as shown in FIG. 2) comprising computer executable instructions, readable and executable by the processor to perform the various functions stated herein, e.g. receiving a selection of text, images and/or documents to be extracted from the mobile device 104 to move to the charger case 100; converting the electronic data being extracted to concealed data by encrypting the electronic data; moving electronic data from the mobile device 104 to the charger case 100; removing items from the mobile device 104 or the charger case 100; and retrieving concealed data from the charger case 100 to the mobile device 104.

The concealed data may be retrieved from the charger case 100 where upon selection, the application program 202, decrypts the encrypted data and moves the decrypted data back to the mobile device 104. In this manner, user can readily retrieve or delete the concealed data stored thereon.

System and Method

Figure 1A:
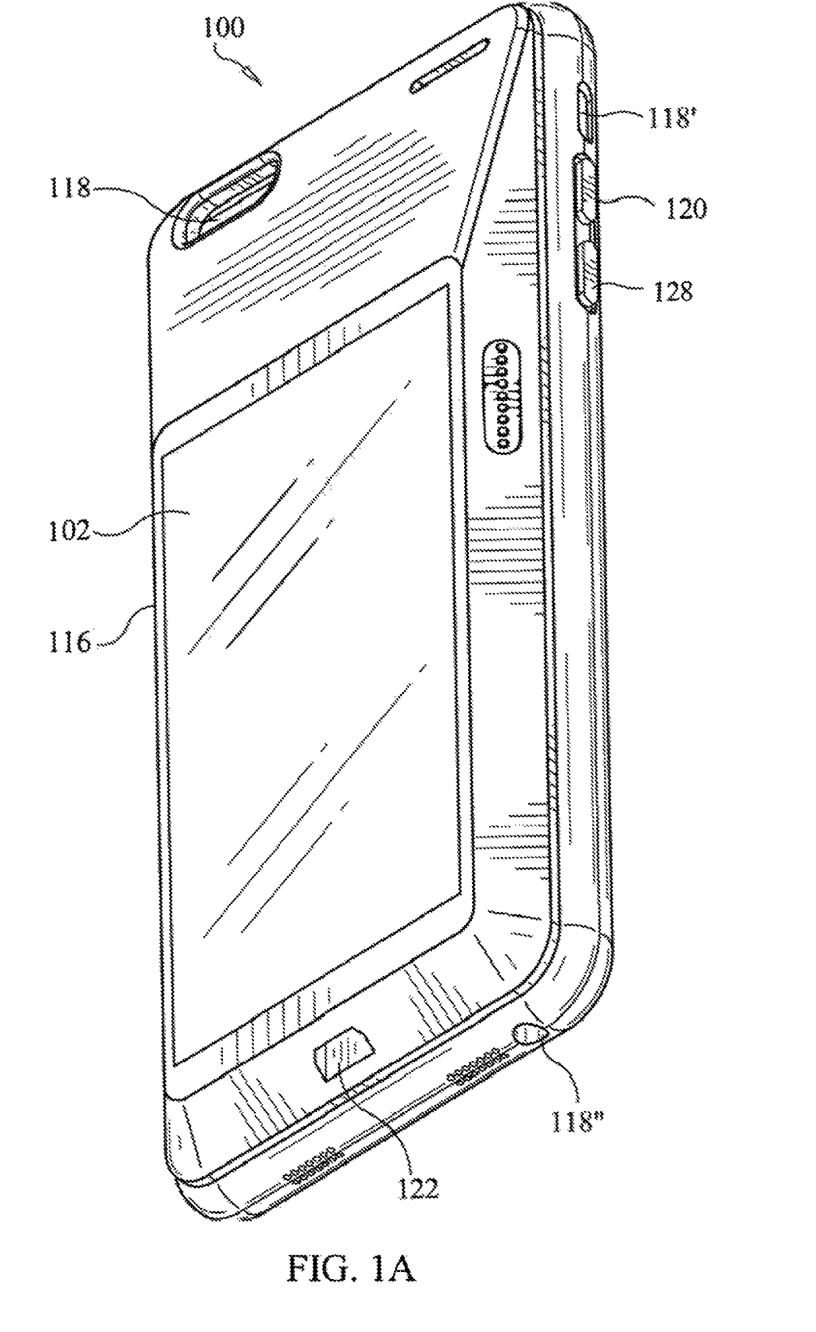
FIGS. 1A-1D show an exemplary embodiment of the apparatus according to one embodiment.
Figure 1B:
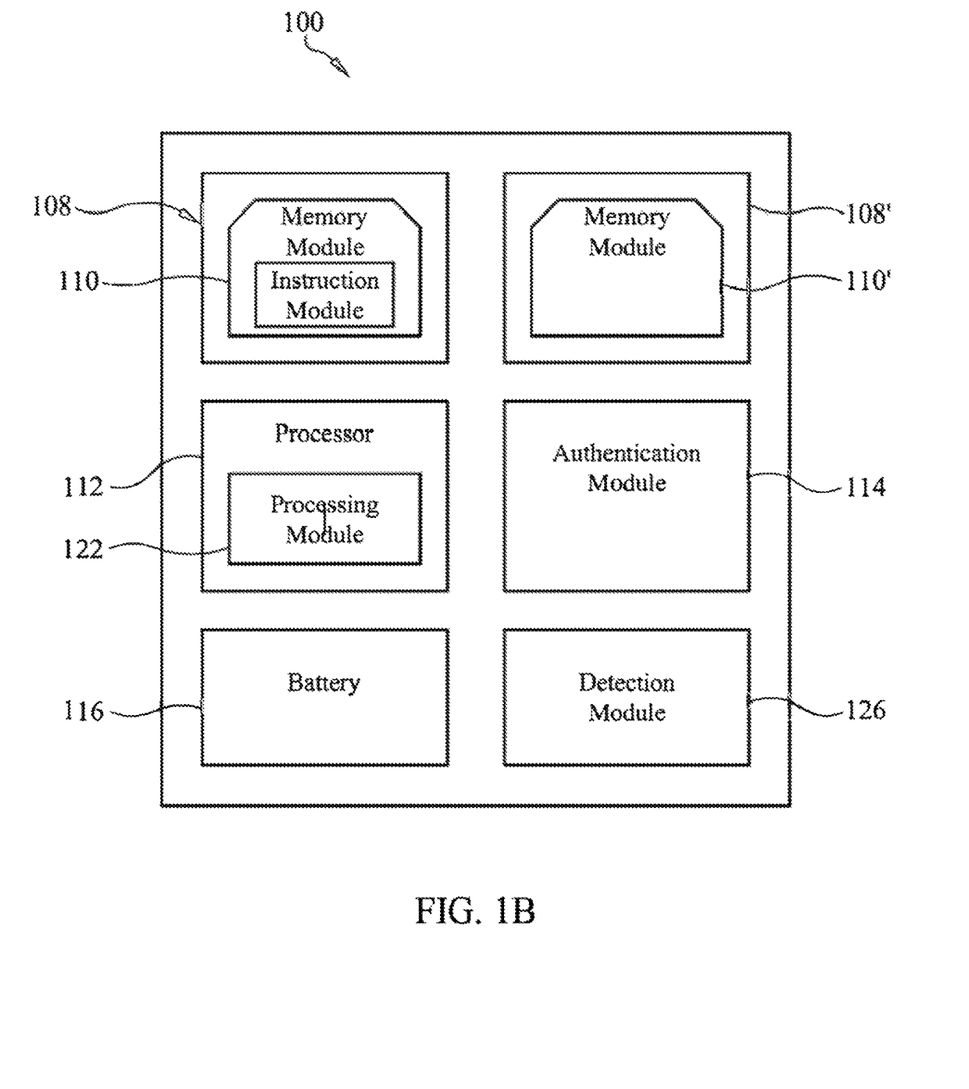
Figure 1C:
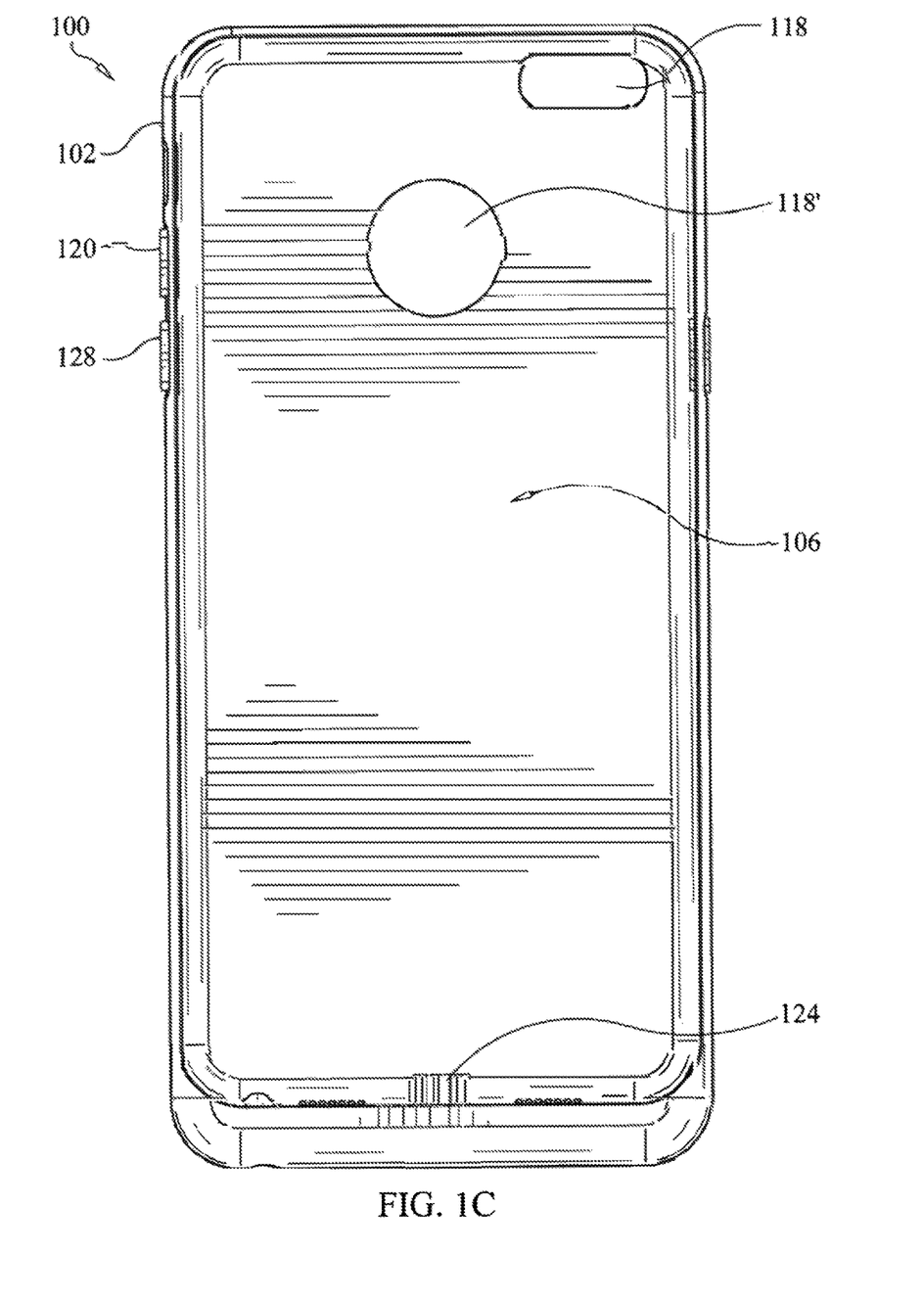
Figure 1D:
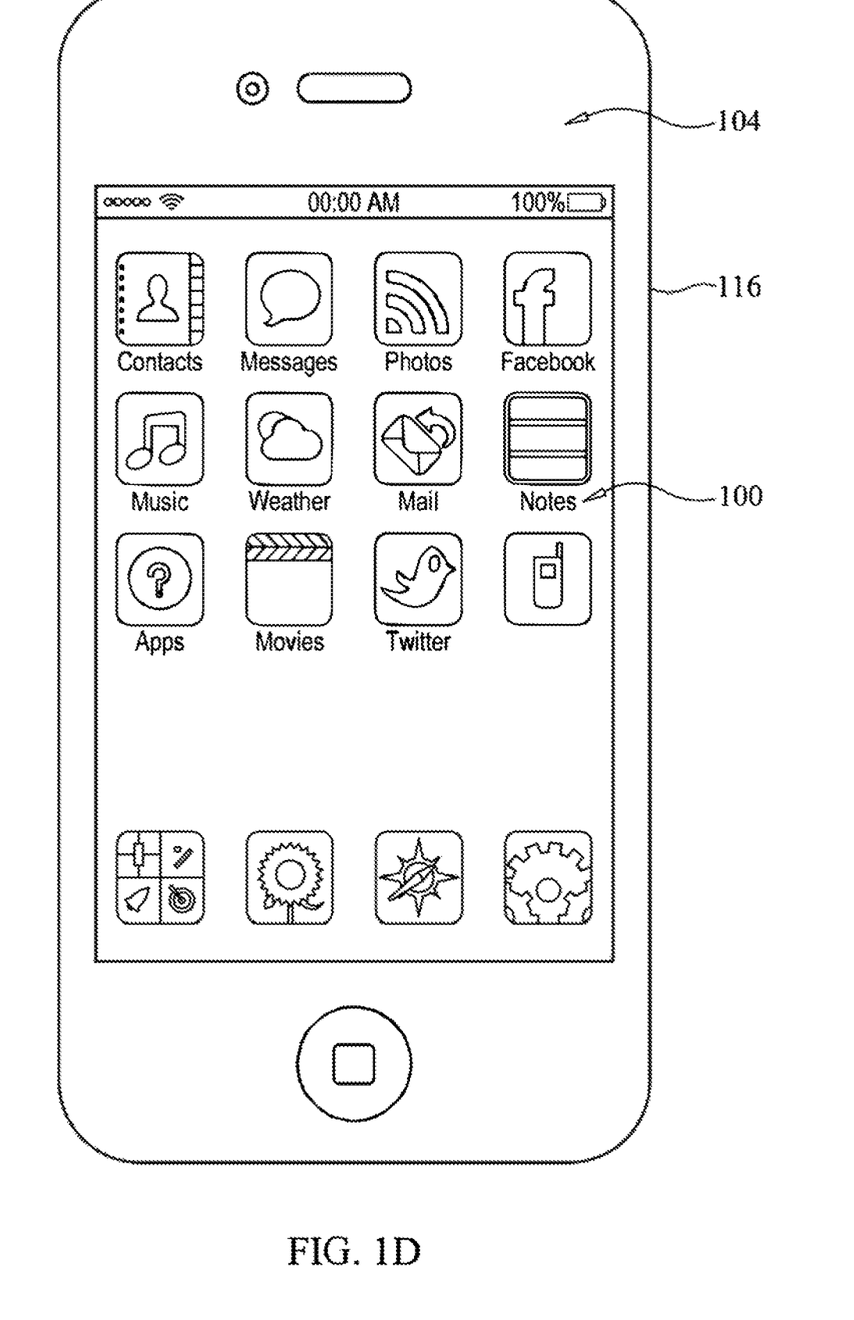
Figure 2:
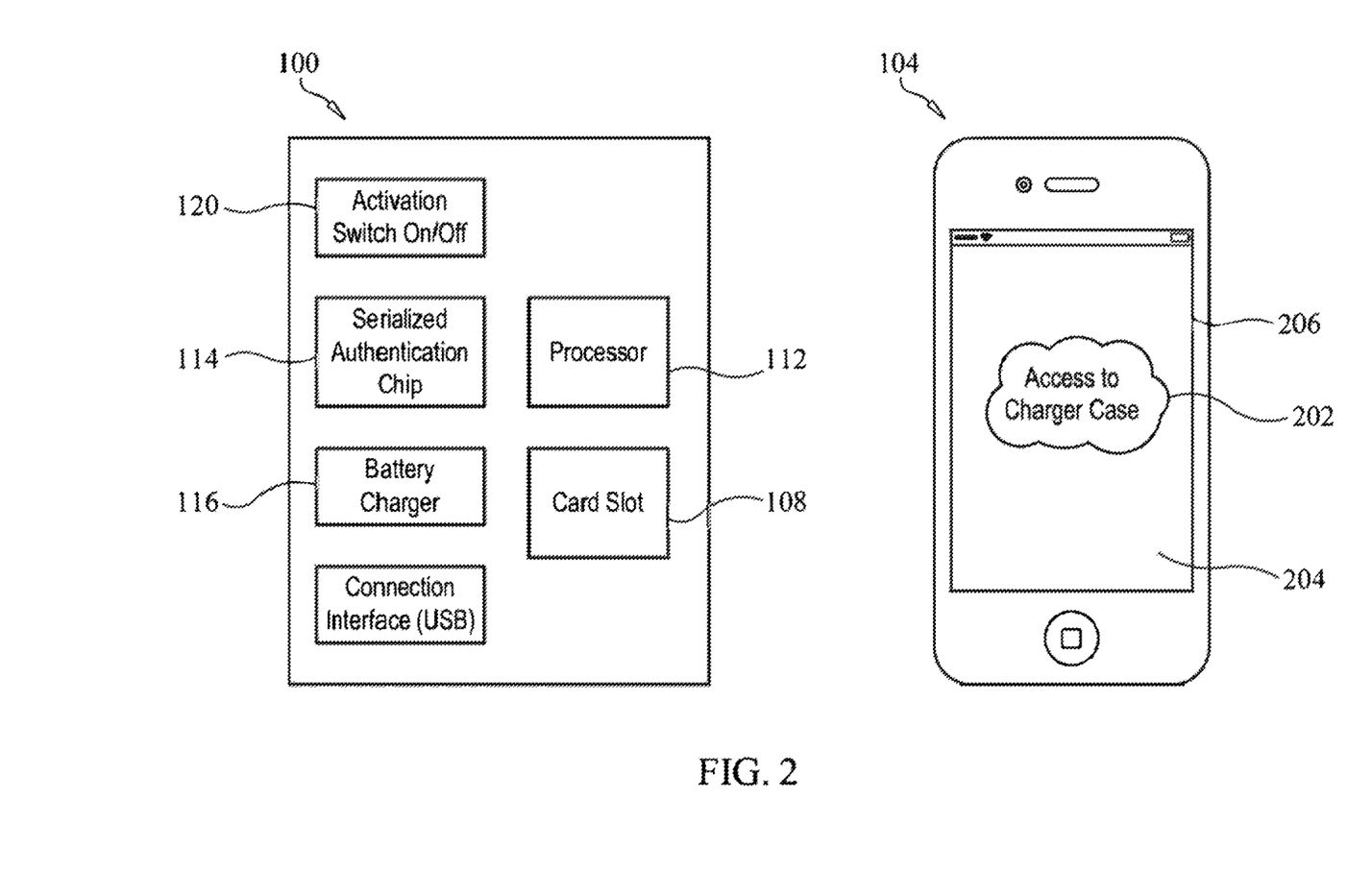
FIG. 2 shows an exemplary embodiment of the system of the invention according to one embodiment.

FIG. 2 shows an exemplary embodiment of the system of the invention according to one embodiment. System 200 comprises an electronic charger case 100 as previously described herein, i.e. comprising a housing 102 shaped to substantially enclose a rear of a mobile device 104 within its primary aperture 106, i.e. a cradle 106, with the housing 102 being adapted to be releasably locked together with the mobile device 104 in a connected position forming a unitary device, i.e. replacing the traditional rear non-electronic panel cover protecting the mobile device's internal electronic circuitry, battery and other like system components; at least one or more means 108, 108' for accepting at least one or more memory modules 110, 110' disposed in communication with at least one processor 112; an authentication module 114, disposed in communication with the at least one processor 112 and enabled for receiving user authentication information and authenticating the user's authorization to access concealed data stored and hidden on the electronic charger case 100 using the received user authentication information; an integrated rechargeable battery 116 cell with charger circuitry housed within the housing 102; a plurality of secondary apertures 118, 118' adapted to enable access to the mobile device's periphery devices and/or a display of the mobile device's logo; an activation switch 120 enabled for activating charging of the mobile device's battery when it is in the connected position within the electronic charger case's housing 102, and/or the charger case 100 when it is connected to an external power source via a charger port 122 as are well known and used in the arts; and a connection interface (USB) 124 for electronically connecting the electronic charger case 100 with the mobile device.

System 200 further comprises of an application software 202 enabled for securing at least one electronic data on the electronic charger case 100, which may comprise in part of a browser, such as for use on the mobile device 104, or a similar browsing device. Application software 202 may be any type of software application, such as a standalone application designed to run on a mobile platform, such as a mobile communication device running an operating system, such as iOS™, Android™, Windows Mobile™, Blackberry™, and the like. Application software 202 may be operative for an iPhone, any other "smart phone", mobile communication device, cellular phone, PDA, GPS or any other mobile device 104 capable of handling transactions dealing with dynamic content, object, application, or software. Application software 202 resides on the electronic charger case 100 or in the mobile device's local memory or may be downloadable to the mobile device 104 from a server. For example, in one embodiment, the application software 202 may be stored on the mobile device 104 and the full-sized software program may be on a server computer, where communications may occur over a network or directly, either wired or wirelessly, or it may reside on the charger case 100. Application software 202 may be displayed as an icon on a display 204 on the mobile device's displaying means 206 and may be launched by activating the icon for the application software 202.

Application software 202 comprises computer executable instructions, readable and executable by the at least one processor, which when executed causes the processor to perform any one or more of the following steps: receive user's authentication information, which may comprise of biometric sample and/or login id and password, validate the user's authentication information against user's authentication information (e.g. biometric identifier) stored thereon; enable access to concealed data stored on the electronic charger case 100 if the user is authenticated, and conversely denying access to user to concealed data if the user's authentication information is not validated; receive user selection of electronic data to be extracted from the mobile device 104 to the charger case's memory module 110 wherein users selection may be entered via clicking an icon, touch, or applying pressure on a touch-screen display, audio or text commands and the like; move electronic data from the mobile device 104 to the charger case 100; convert the electronic data being stored on the charger case 100 to concealed data by encrypting the electronic data responsive to the user selection; store and hide the concealed data responsive to the user selection, i.e. unavailable for display on the displaying means 206 unless an alternate command is received and user's identity authentication information is verified. An alternate command may include a counter command for hiding the concealed data, e.g. "Show" or "Display" provided in text, audio or use of a drop down menu on the mobile device's display 204.

In some embodiments, the concealed data is wholly unavailable for display anywhere on the mobile device's displaying means and is only accessible upon user authentication for accessing the electronic charger case 100. In this manner, the information is held secure as an unauthorized user will not be able to detect the existence of the undisplayed information for which there are insufficient indicators that the information exists, especially since the application software 202 will not open without user authentication. In some embodiments, the concealed data is stored on the charger case 100 and user will need to actively select the retention of the unencrypted electronic data on the mobile device 104 as the application software may be enabled to automatically delete the electronic data once the concealed data is stored.

Application software 202 is configured for enabling the processor to perform any one or more of the following steps: display all available content on the mobile device's displaying means including folders, applications and programs while excluding the concealed data (encrypted electronic data stored on the charger case 100) from the display; remove the concealed data from the mobile device 104; make available for display (wholly or in part) concealed data stored on charger case 100 upon validation of user's biometric authentication; receive user selection of concealed data to be retrieved from the charger case 100 to the mobile device 104; restore the electronic data to the mobile device by retrieving the concealed data hidden in the at least one or more secure memory modules 110, 110', convert the concealed data to electronic data making it available for display on the mobile device's memory displaying means 206; erase from the charger case 100 the concealed data that has been retrieved; and/or receive editing commands within the at least one or more secure memory modules 110, 110' to effectuate edits to the concealed data.

Mobile device's displaying means 206 as described herein may include any kind of displaying means 206, such as, but not limited to: a liquid crystal display ("LCD") screen, a light emitting diode ("LED") display, touchpad or touch screen display, and/or any other means known in the arts for emitting a visually perceptible output. Mobile device 104 may include a processor of similar configuration as previously, and further described herein, that is in electronic communication with its displaying means 206. Displaying means 206 may include a control element, such as, but not limited to, a touch screen, a stylus, and the like. In some embodiments, displaying means 206 may be electronically connected to the mobile communication 102 according to the hardware and software protocols that are well known and used in the arts. Mobile device's processor controls the mobile device's displaying means 206, which is configured for displaying the icons, command and/or instructions from the activated application software 202 when in use for controlling and/or accessing the concealed data stored on the secure memory modules 110, 110' on the charger case 100 and the user's authentication information is verified by any one or more of the following: login id, password or a biometric identifier, for example finger prints, retina scan, etc.

Figure 3:
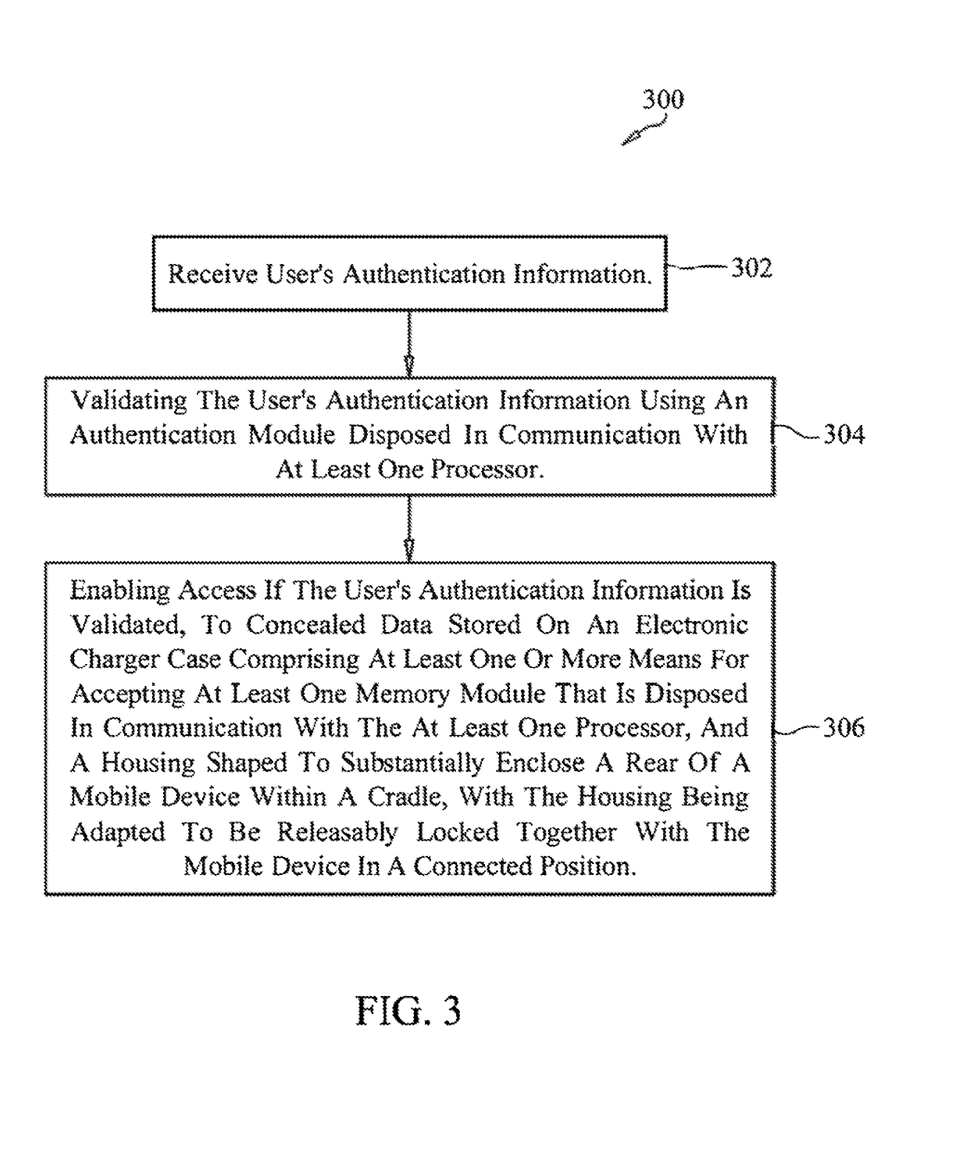
FIG. 3 shows an exemplary computer implemented method of the invention according to one embodiment.

FIG. 3 shows an exemplary computer implemented method 300 of the invention according to one embodiment, wherein method 300 comprises using at least one processor connected to the charger case 100 to perform any of the following: receive user's authentication information (step 302); validating the user's authentication information using an authentication module 114 disposed in communication with at least one processor 112 (step 304); and enabling access if the user's authentication information is validated, to concealed data stored on an electronic charger case 100 comprising at least one or more means 108 for accepting at least one or more memory modules 110, 110' that is disposed in communication with the at least one processor, and a housing 102 shaped to substantially enclose a rear of a mobile device 104 within a cradle 106, with the housing 102 being adapted to be releasably locked together with the mobile device 104 in a connected position.

Method 300 further comprises activating an application software 202 enabling receipt of an input command per user selection, for concealing electronic data to be extracted from the mobile device 104 to be hidden on the charger case's removable at least one or more memory modules 110, 110' (step 308); concealing electronic data by moving the electronic data from the mobile device 104 to the charger case 100 and deleting the electronic data from the mobile device and/or disabling the electronic data from being displayed on the mobile device; encrypt electronic data being stored on the charger case 100; storing and hiding the electronic data responsive to the user selection by converting the at least one item of electronic data into concealed data, wherein the concealed data in some embodiments is wholly unavailable for display anywhere on the mobile device's displaying means.

Method 300 further comprises displaying a display of all available content on the mobile device's displaying means 206 including folders, applications and programs while excluding the concealed data (encrypted electronic data stored on the charger case 100) from the display; removing the concealed data from the mobile device 104; making available for display (wholly or in part) concealed data stored on charger case 100 upon validation of user's biometric authentication; receive user selection of concealed data to be retrieved from the charger case 100 to the mobile device 104; restoring the electronic data to the mobile device by retrieving the concealed data hidden in the at least one or more secure memory modules 110, 110', converting the concealed data to electronic data making it available for display on the mobile device's memory displaying means 206; erasing from the charger case 100 the concealed data that has been retrieved; and/or receiving editing commands within the at least one or more secure memory modules 110, 110' to effectuate edits to the concealed data.

Method 300 further comprises implementing the various systems discussed herein.

Hardware and Operating Environment

This section provides an overview of exemplary hardware and the operating environments in conjunction with which embodiments of the inventive subject matter can be implemented.

A software program may be launched from a computer readable medium in a computer-based system 100, to execute the functions defined in the software program. Various programming languages may be employed to create software programs designed to implement and perform the method disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
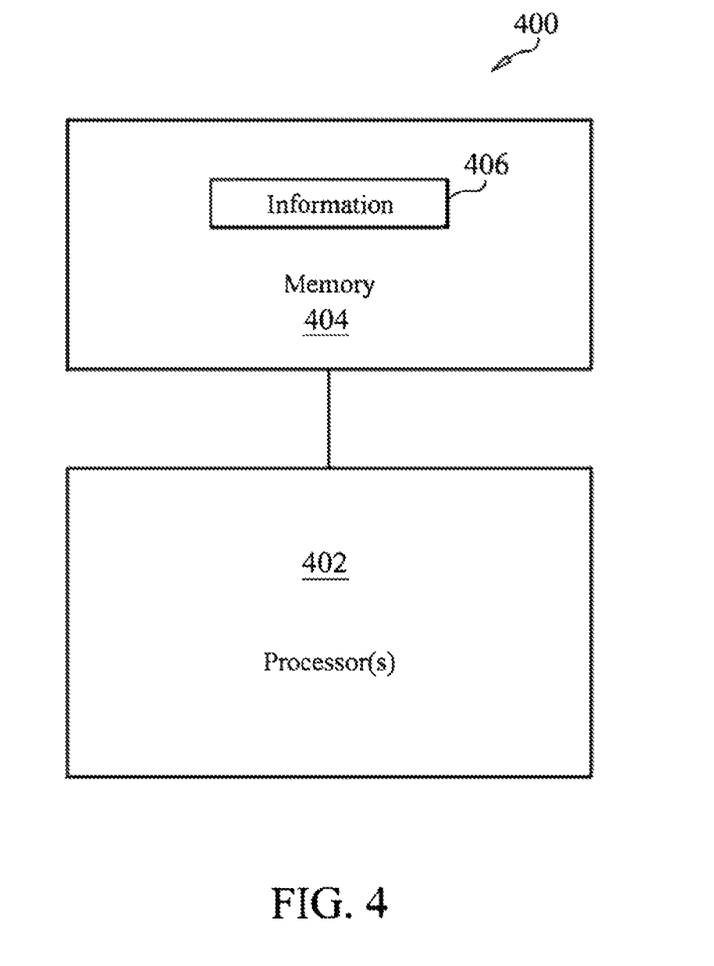
FIG. 4 is a block diagram representing an apparatus according to various embodiments.

FIG. 4 is a block diagram representing an apparatus 400 according to various embodiments. Such embodiments may comprise a computer, a memory means 402, a magnetic or optical disk, some other storage device, or any type of electronic device or system. The apparatus 400 may include one or more processor(s) 404 coupled to a machine-accessible medium such as memory means 402 (e.g., a memory including electrical, optical, or electromagnetic elements). The medium may contain associated information 406 (e.g., computer program instructions, data, or both) which, when accessed, results in a machine (e.g., the processor(s) 404) performing the activities previously described herein.

The principles of the present disclosure may be applied to all types of computers, systems, and the like, include desktop computers, servers, notebook computers, ipads, personal digital assistants, microcomputers, and the like. However, the present disclosure may not be limited to the cellular phones.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. An electronic charger case comprising:
   a housing shaped to enclose a rear of a mobile device within a cradle, with the housing being configured to be releasably locked together with the mobile device in a connected position;
   a card tray or slot that is disposed in communication with at least one hardware processor;
   an authentication module, executed by the at the least one hardware processor, which receives password verification information or user authentication information from a biometric reader;
   battery positioned within the housing;
   a detection module, wherein the detection module comprises a sensor, and wherein the detection module detects a presence of at least one removable memory module being present within the card tray or slot, wherein at least one memory module receives electronic data for storage from the mobile device that is converted to encrypted concealed data and stored thereon;
   a connection interface electronically connecting the electronic charger case with the mobile device to lock the charger case in the connected position by preventing relative movement between the housing and the mobile phone by maintaining the engagement until the housing or the mobile phone is released; and
   a serialized authentication chip that manages and allows access through the mobile device that allows only authorized connectors to connect to the mobile device.

2. The electronic charger case of claim 1, further comprising a plurality of secondary apertures adapted to enable access to the mobile device's periphery devices and/or a display of the mobile device's logo.

3. The electronic charger case of claim 1, further comprising an activation switch enabled for activating charging of the charger case, the mobile device, or combination thereof.

4. The electronic charger case of claim 1, wherein the removable memory module is enabled for storing: folders, documents, videos, pictures, SMS texts, contact listings, music downloads, third party applications, games, emails, calendars, notes, hyperlinks, downloaded data or call logs.

5. The electronic charger case of claim 1, wherein the authentication module receives any one or more of the following: login id, password or biometric identifier.

6. The electronic charger case of claim 1, wherein the circumference of the housing at least partially encase the outer walls of a rear of the mobile device.

7. A system comprising:
   a mobile device that includes memory; and
   an electronic charger case comprising:
      a housing shaped to enclose a rear of a mobile device within a cradle, with the housing being configured to be releasably locked together with the mobile device in a connected position;
      a card tray or slot that is disposed in communication with at least one hardware processor;
      an authentication module, wherein the authentication module comprises a biometric reader, and wherein the authentication module receives password verification information or user authentication information;
      battery positioned within the housing;
      a detection module, wherein the detection module comprises a sensor, and wherein the detection module detects presence of at least one removable memory module being present within the card tray or slot, wherein at least one memory module receives electronic data for storage from the mobile device that is converted to encrypted concealed data and stored thereon;
      a connection interface electronically connecting the electronic charger case with the mobile device to lock the charger case in the connected position by preventing relative movement between the housing and the mobile phone by maintaining the engagement until the housing or the mobile phone is released; and
      a serialized authentication chip that manages and allows access through the mobile device that allows only authorized connectors to connect to the mobile device.

8. The system of claim 7, wherein the removable memory module is enabled for storing: folders, documents, videos, pictures, SMS texts, contact listings, music downloads, third party applications, games, emails, calendars, notes, hyperlinks, downloaded data or call logs.

9. The system of claim 7, further comprising an application program, stored in memory executable by the at least one processor's computer executable instructions, and configured for performing any one or more of the following:
   display all available content on the mobile device's displaying means while excluding the concealed data from the display;
   remove the concealed data from the mobile device;
   make available for display concealed data stored on charger case upon validation of user's authentication;
   deny access to user if the user is not authenticated;

erase from the charger case the concealed data that has been retrieved; and receive editing commands within the at least one or more secure memory modules to effectuate edits to the concealed data.

10. The system of claim 7, further comprising an application program, wherein the application program converts the electronic data being stored on the charger case to concealed data by encrypting the electronic data responsive to the user selection.

11. The system of claim 7, further comprising an application program, wherein the application program encrypts any one or more of the following: at least one content.

12. The system of claim 7, further comprising an application program, wherein the application program restores the electronic data to the mobile device by retrieving the concealed data hidden in the at least one or more secure memory modules, converting the concealed data to electronic data making it available for display.

13. A computer implemented method comprising:
activating an authentication module, wherein the authentication module comprises software that is executed by at least one processor coupled to a charger case, to receive password verification information or user authentication information from a biometric reader;
validating the user's authentication information using the authentication module disposed in communication with the at least one processor connected to the charger case;
enabling access when the user's authentication information is validated, to concealed data stored on an electronic charger case, a card tray or slot that is disposed in communication with the at least one processor, a housing shaped to enclose a rear of a mobile device within a cradle, with the housing being configured to be releasably locked together with the mobile device in a connected position, a connection interface electronically connecting the electronic charger case with the mobile device to lock the charger case in the connected position by preventing relative movement between the housing and the mobile phone by maintaining the engagement until the housing or the mobile phone is released, and a serialized authentication chip that manages and allows access through the mobile device that allows only authorized connectors to connect to the mobile device; and
detecting using a detection module, comprising software executed by the at least one processor, to detect presence of at least one removable memory module being present within the card tray or slot, wherein at least one memory module receives electronic data for storage from the mobile device that is converted to encrypted concealed data and stored thereon.

14. The computer implemented method of claim 13, further comprising denying access to user to concealed data if the user's authentication information is not validated.

15. The computer implemented method of claim 13, further comprising deleting the electronic data from the mobile device and/or disabling the electronic data from being displayed on the mobile device.

16. The computer implemented method of claim 13, further comprising concealing the electronic data responsive to the user selection by converting the at least one item of electronic data into concealed data, wherein the concealed data in some embodiments is wholly unavailable for display anywhere on the mobile device's displaying means.

17. The computer implemented method of claim 13, further comprising making available for display concealed data stored on charger case upon validation of user's biometric authentication.

18. The computer implemented method of claim 13, further comprising restoring the electronic data to the mobile device by retrieving the concealed data hidden in the at least one or more secure memory modules, converting the concealed data to electronic data making it available for display on the mobile device's memory displaying means.

19. The computer implemented method of claim 13, further comprising displaying a display of all content on the mobile device's displaying means while excluding the concealed data from the display; removing the concealed data from the mobile device.

* * * * *